United States Patent
Yoshizawa et al.

(10) Patent No.: US 7,362,483 B2
(45) Date of Patent: Apr. 22, 2008

(54) POSTPROCESSING APPARATUS AND POSTPROCESSING METHOD

(75) Inventors: Hisae Yoshizawa, Ashigarakami-gun (JP); Katsunori Kawano, Ashigarakami-gun (JP); Jiro Minabe, Ashigarakami-gun (JP); Kazuhiro Hayashi, Ashigarakami-gun (JP); Yasuhiro Ogasawara, Ashigarakami-gun (JP); Shin Yasuda, Ashigarakami-gun (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1 day.

(21) Appl. No.: 10/953,320

(22) Filed: Sep. 30, 2004

(65) Prior Publication Data

US 2005/0213175 A1 Sep. 29, 2005

(30) Foreign Application Priority Data

Mar. 23, 2004 (JP) ............................. 2004-085213

(51) Int. Cl.
*G09C 3/00* (2006.01)
*G03H 1/20* (2006.01)
(52) U.S. Cl. .............................. 359/12; 359/35; 359/2; 382/112
(58) Field of Classification Search .................... 359/2, 359/12, 35
See application file for complete search history.

(56) References Cited

U.S. PATENT DOCUMENTS

| 4,933,120 A | * | 6/1990 | D'Amato et al. ........... 264/1.34 |
| 6,308,630 B1 | * | 10/2001 | Kurokawa et al. .......... 101/492 |
| 2002/0050714 A1 | * | 5/2002 | Imai et al. .................... 283/74 |
| 2004/0039700 A1 | * | 2/2004 | Meier ........................... 705/41 |
| 2005/0129281 A1 | * | 6/2005 | Ashizaki et al. ............. 382/112 |

FOREIGN PATENT DOCUMENTS

| JP | A 09-090665 | 4/1997 | |
| JP | A 10-340479 | 12/1998 | |
| JP | A 2000-211257 | 8/2000 | |
| WO | WO 03/075217 A1 * | 9/2003 | ................ 359/15 |

OTHER PUBLICATIONS

Wakita et al., "A Study for Linking Between WWW and Paper by 2D Code," Human Interface 76-1, Information Media 33-1 {Jan. 29, 1998}.
Mycom PC Web, News Headline, http://pcweb.mycom.co.jp/news/2001/07 5/22.html {Jul. 5, 2001}.

* cited by examiner

*Primary Examiner*—Fayez G. Assaf
(74) *Attorney, Agent, or Firm*—Oliff & Berridge, PLC (57) ABSTRACT

A postprocessing apparatus for conducting postprocessing on an image forming member, including a receiving unit for receiving an image forming member having an image formed thereon, and an attaching unit for attaching a hologram recording medium in which a hologram can be written, to the image forming member. The postprocessing apparatus further includes a recording unit for writing related information corresponding to image formed on the image forming member, onto the hologram recording medium.

18 Claims, 10 Drawing Sheets

POSTPROCESSING APPARATUS AND POSTPROCESSING METHOD

CROSS-REFERENCE TO RELATED APPLICATION

This application claims priority under 35 USC 119 from Japanese Patent Application No. 2004-85213, the disclosure of which is incorporated by reference herein.

BACKGROUND OF THE INVENTION

1. Field of the Invention

The present invention relates to a postprocessing apparatus and postprocessing method. In particular, the invention relates to a postprocessing apparatus and postprocessing method, for conducting postprocessing on an image forming member having an image formed thereon.

2. Description of the Related Art

With the development of information communication devices, upgrading of communication infrastructures, and spread of personal computers in recent years, it has become possible to: acquire a large amount of information via electronic media which record and transfer electronic information; and, process that information on computers. On the other hand, as a medium for recording and transferring information, paper has been used from a long time ago. Still now, various kinds of information are send and exchanged by using paper as a medium such as post cards, letters, books and newspapers.

Both electronic media and the paper medium have their respective merits. Electronic media are excellent in terms of processability, reusability, ease of retrieval of information, and ease of linking information. On the other hand, the paper medium is excellent in terms of ease of seeing at a glance, portability and substantiality. Therefore, it would be ideal if electronic media and the paper medium could mutually complement each other, making the most of mutual merits, instead of replacing the paper medium with electronic media.

Information on an electronic medium can be converted to information on a paper medium by "printing." During the process of printing, however, digital information on an electronic medium can be lost. Furthermore, information on a paper medium can be converted to information on an electronic medium by using a character recognition apparatus such as an OCR (Optical Character Reader) and the like. In techniques of image recognition, however, there is a limit to the recognition performance and conversion speed.

In order to solve these problems, various methods of printing a code which can be converted into digital code, such as the Glyphe code or a two-dimensional bar code, and the like, have been proposed. For example, a system that fuses information on the WWW (World Wide Web) and information on a paper medium has been proposed. This is done by representing URLs (Uniform Resource Locators) to information which is related to that which is printed on a paper medium using a two-dimensional code and printing this two-dimensional code on the paper medium (e.g., see "A Study for linking between WWW and paper by 2D code," Human Interface 76-1, Information Media 33-1, Jan. 29, 1998).

As a two-dimensional code, for example, the "QR code (R)" can be used. By using a QR code (R) of 41 by 41 cells, 134-bytes of data can be stored (recorded), and this is sufficient for describing URL information or ID information. By using this system, it becomes possible to: read the QR code (R) provided on the paper medium; access a URL on the WWW; and, obtain electronic information corresponding to information on the paper medium, as the occasion demands.

Recently, a subminiature semiconductor chip named "µ-chip (R)" from which data stored in it can be read externally without contact and which can be embedded in paper or the like has been developed (e.g., see MYCOM PC WEB, NEWS HEADLINE, Jul. 5, 2001; http://pcweb.my-com.co.jp/news/2001/07/5/22. html). By embedding a µ-chip (R) storing URL information and ID information in a paper medium, it becomes possible to read out this information without contact.

As a recording medium on which an image can be formed by a copying machine or the like in the same way as the paper medium, there is also an "OHP sheet." There are suitable specifications for OHP sheets for each type of copying machine, thus it is desirable to use genuine articles corresponding to the copying machine type. Therefore, an OHP sheet which can be verified as to whether it is a genuine article or not, by using a reproduced image from a transparent hologram provided on the sheet, has been proposed (see Japanese Patent Application Laid-Open (JP-A) No. 09-090665).

In addition, a printing apparatus for transferring and printing a hologram image on a display medium, such as paper, using a thermal head and a transfer foil ribbon, having a hologram pattern formed previously thereon has been proposed. Also a display medium created by the above printing apparatus has been proposed (see JP-A No. 2000-211257). In this printing apparatus, on-demand printing of a hologram image can be conducted.

However, the above-described two-dimensional code and semiconductor chips only have at most several hundreds of bytes of storage capacity. This storage capacity is enough to store URL information and ID information, but it is far too little to store all the information printed on a paper medium in electronic form. In the end, there are no methods other than to: provide a server, for storing and managing electronic information as a data center; and extracting large volumes of electronic information from the server, by using URL information or ID information, extracted from two-dimensional codes or semiconductor chips as a key. Therefore, there is a problem in that the system cannot help but be very large in scale where electronic information previously stored in the server, corresponding to information on a paper medium, is managed by using IDs.

Furthermore, the previously described µ-chip (R) is dedicated to reading, and it cannot be written with new information or information stored on it rewritten. Therefore, there is a problem that the µ-chip (R) is not suitable for on-demand printing in which it is necessary to store different information for each pages of paper medium. On the other hand, a hologram recording media has a larger storage capacity than the two-dimensional code or semiconductor chip. However, the conventional hologram recording media, such as a relief-type hologram, having convexo-concave patterns formed on a plastic film by pressing, is dedicated to reading, and it is, in the same way, not suitable for on-demand printing.

Furthermore, a paper medium having a semiconductor chip embedded therein is harmful to the environment, and cannot be discarded as it is. Therefore, there is a problem that it is necessary to sort out paper media having semiconductor chips embedded therein and separately recover the semiconductor chips when discarding paper media.

In addition, a display medium having a holographic image produced by on-demand printing is proposed in JP-A No. 2000-211257. However, the holographic image is used visually, and invisible electronic information cannot be added to the display medium.

SUMMARY OF THE INVENTION

In the light of the above-described problems, the present invention provides a postprocessing apparatus, and a postprocessing method which is: capable of directly attaching electronic information to an image forming material such as a paper medium or the like, having an image formed thereon; where the electronic information corresponds to that of the formed image.

A feature of the invention is that a hologram recording medium, on which a hologram can be written, is attached to an image forming member when postprocessing the image forming member, having an image formed thereon. By thus attaching a hologram recording medium to an image forming member, such as paper medium or the like, it becomes possible to record electronic information, corresponding to the formed image, onto the hologram recording medium.

A first aspect of the invention is to provide a postprocessing apparatus that conducts postprocessing on an image forming member, including: a receiving unit that receives an image forming member having an image formed thereon; and an attaching unit that attaches a hologram recording medium in which a hologram can be written, to the image forming member.

A second aspect of the invention is to provide a postprocessing apparatus that conducts postprocessing on an image forming member, the postprocessing apparatus including: a receiving unit that receives an image forming member having an image formed thereon; and a recording unit that writes related information corresponding to an image formed on the image forming member, onto a hologram recording medium.

A third aspect of the invention is to provide a postprocessing method for conducting postprocessing on an image forming member having an image formed thereon, the postprocessing method including: an attaching process for attaching a hologram recording medium in which a hologram can be written, to the image forming member; and a recording process for writing related information corresponding to an image formed on the image forming member, onto the hologram recording medium.

As described above, according to the invention, it becomes possible to write the electronic information corresponding to that of with a formed image onto a hologram recording medium, and attach the hologram recording medium to an image forming member, such as the paper medium or the like, having an image formed thereon. In other words, according to the invention, it is possible to provide a novel information medium with an electronic medium, which is capable of transmitting a large volume of electronic information, and the paper medium integrated into one body.

Since the electronic medium and the paper medium are united into one body, it is not necessary to provide a server or the like for storing and managing the electronic information. Thus, a large-scale system is not required.

Furthermore, by recording authentication data and reproduction restriction information and the like, additionally on a hologram recording medium, reproduction of electronic information can be restricted accordingly, and an information transmission medium with high security can be provided. A system with high security can also be constructed by using such a medium.

BRIEF DESCRIPTION OF THE DRAWINGS

Preferred embodiments of the present invention will be described in detail based on the following figures, wherein.

DETAILED DESCRIPTION OF THE INVENTION

Hereinafter, an example of an image forming apparatus according to an embodiment of the present invention will be described in detail with reference to the drawings. The image forming apparatus of the present embodiment includes a postprocessing apparatus of the invention.

(Image Forming Apparatus)

Figure 1:
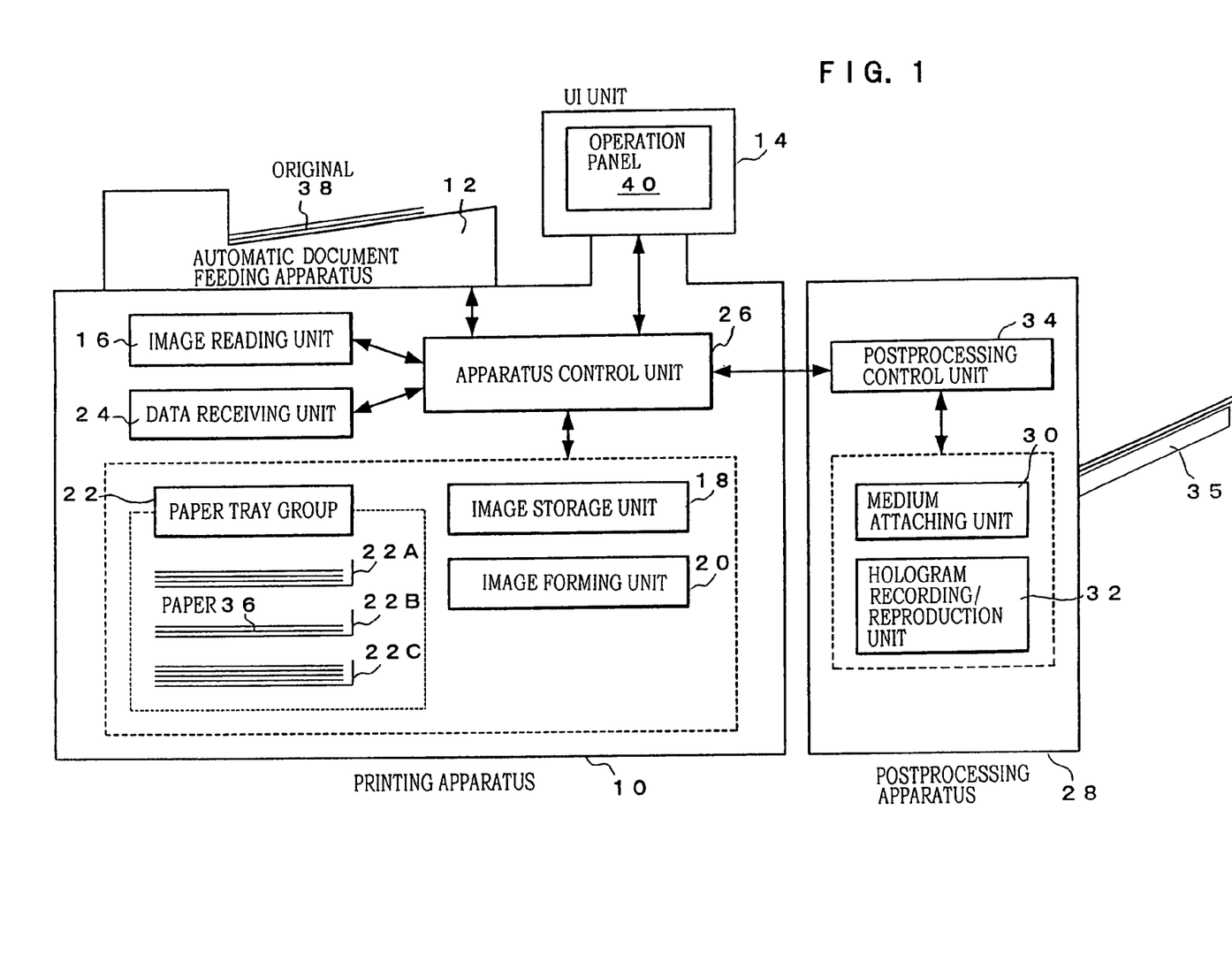
FIG. 1 is a schematic configuration diagram of an image forming apparatus according to an embodiment of the present invention.

As shown in FIG. 1, the image forming apparatus of the present embodiment is a so-called multifunction device having several functions of a copying machine, a printer, a facsimile, and so on. The image forming apparatus includes a printing apparatus 10 for printing an image on paper 36 which serves as an image forming material, and a postprocessing apparatus 28 for conducting postprocessing on the paper 36 which has the image printed thereon.

The printing apparatus 10 includes: an automatic original document apparatus 12, for supplying an original 38 sheet by sheet to an image reading unit 16, described later; a user interface unit (UI unit) 14 for selecting desired processing and setting the number of sheets of paper for printing an image thereon and the number of copies; an image reading unit 16, for reading an original image; an image storage unit 18, for temporarily storing the read image; an image forming unit 20, for printing the image stored in the image storage unit 18 on the paper 36 and discharging the printed paper; a paper tray group 22, including several trays 22A, 22B and 22C, so as to house several kinds of paper 36; a data receiving unit 24, for receiving image data, or the like, transmitted from an external personal computer, or the like; and, an apparatus control unit 26 including a CPU (not shown) and a memory (not shown).

The postprocessing apparatus 28 includes: a receiving unit (not shown), for receiving paper 36 having an image printed thereon; a medium attaching unit 30, for attaching a hologram recording medium, which will be described later, to the paper 36 having the image printed thereon; a hologram recording/reproduction unit 32, for recording information relating to the printed image (related information) onto the hologram recording medium and reproducing the recorded information; and, a postprocessing control unit 34 having a CPU (not shown) and a memory (not shown), and controlling the medium attaching unit 30 and the hologram recording/reproduction unit 32.

Each of the automatic document feeding apparatus 12, the UI unit 14, the image reading unit 16, the image storage unit 18, the image forming unit 20, and the data receiving unit 24 is connected to the apparatus control unit 26, via a bus (not shown), and controlled by the apparatus control unit 26. The postprocessing control unit 34 is also connected to the apparatus control unit 26. Instruction information regarding the postprocessing, from the input to UI unit 14, and related information, received by the data receiving unit 24, are transmitted to the post processing control unit 34.

The UI unit 14 includes an operation panel 40 formed by putting a touch panel on a liquid crystal display plate. Various input screens are displayed on the operation panel 40. By operating this operation panel 40, a user can set: the number of output sheets of paper; the number of output copies; picture quality of output image; postprocessing, such as stapling and punching; and instruct the printing operation to start. In the present embodiment, the process of attaching the hologram recording medium and process of recording related information can be selected in the postprocessing settings. Therefore, the user can instruct attachment of the hologram recording medium via the operation panel 40. The UI unit 14 displays various messages under the control of the apparatus control unit 26.

The image forming unit 20 includes a print engine (not shown) for transferring a toner image onto the paper 36, and a fixer (not shown) for fixing the toner image on the paper 36. The image forming unit 20 prints an image onto the paper 36 by electrophotography.

(Details of Postprocessing)

The postprocessing apparatus 28 conducts attaching of a hologram recording medium and records related information onto the hologram recording medium.

Figure 2A:
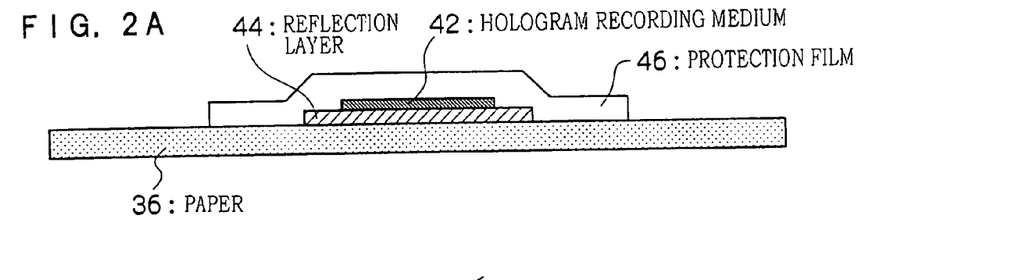
FIG. 2A, FIG. 2B, and FIG. 2C are schematic configuration diagrams showing a state in which a hologram recording medium is attached to paper in the present embodiment.
Figure 2B:
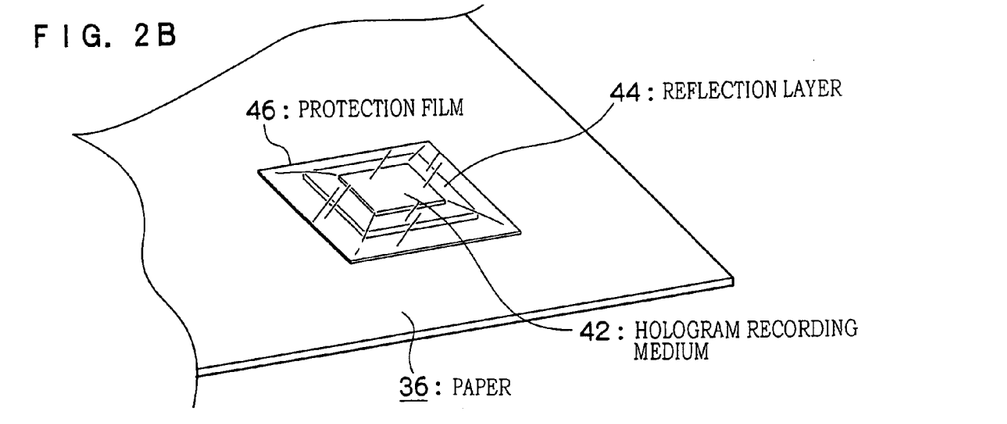

FIGS. 2A and 2B are diagrams showing a state in which a hologram recording medium 42 has been attached to the paper 36. The hologram recording medium 42 is formed as a sheet-like chip having a thickness of several tens of µm and an area of several mm square, and placed on a reflection layer 44 which is a size larger than the hologram recording medium 42. The hologram recording medium 42 together with the reflection layer 44 is stuck onto the paper 36 by a transparent protection film 46 so as to bring the reflection layer 44 into contact with the paper 36.

It is also possible to omit the reflection layer 44 and the protection film 46 and stick the hologram recording medium 42 directly onto the paper.

As for the hologram recording medium 42, there is no special restriction so long as it is a recording medium on which a hologram can be written. As a recording material for forming such a medium, a photorefractive material or a polarization sensitive material can be used in which: photo-induced refractive index changes or photo-induced dichroism is exhibited; and, the characteristic is maintained at normal temperature. Furthermore, with these recording materials, it is also possible to erase a hologram recorded by light irradiation and record a new hologram, i.e., rewrite a hologram. In these materials, a macromolecule having a radical which can be photoisomerized in a side chain is suitable, for example, at least one kind of polymer selected from the group of polyesters, having a radical which can be photoisomerized, such as an azobenzene skeleton, in a side chain.

Azobenzene repeats a trans-cis-trans isomerization cycle in response to light irradiation. Before light irradiation, a large number of trans-azobenzene molecules exist in an optical recording layer. These molecules are oriented at random, and are isotropic from a macroscopic viewpoint. When linearly polarized light is irradiated, azobenzene molecules having an absorption axis of the same orientation as the polarization direction are selectively subjected to trans-cis isomerization. Molecules which have relaxed into a trans-isomer having an absorption axis perpendicular to the polarization direction do not any longer absorb light and so are fixed in that state. As a result, anisotropy in absorption coefficient and refractive index, i.e., dichroism and birefringence, is induced from a macroscopic viewpoint. For polymers including such a photoisomerized radical, the orientation of the polymer itself is also changed by photoisomerization and large birefringence can be induced. The birefringence thus induced is stable up to the glass transition temperature of the polymer, and is suitable for hologram recording.

For example, polyester having cyanoazobenzene in its side chain represented by the following chemical formula (see JP-A No. 10-340479) is suitable as a material for recording a hologram due to having the above described structure. This polyester can record the polarization direction of a signal beam as a hologram by photo-induced anisotropy caused by photoisomerization of cyanoazobenzene in the side chain. The hologram can be recorded at the room temperature and, unless erasing light is applied, the recorded hologram can be retained semi-permanently.

From the viewpoint of preventing bulkiness, the thickness of the hologram recording medium 42 is preferably in the range of about 0.1 to 200 μm. Further for increasing the diffraction efficiency, the thickness of the hologram recording medium 42 is more preferably in the range of about 10 to 30 μm. The hologram recording medium 42 is formed into a sheet form by fabricating a formed plate, by injection molding, then interposing the formed plate between a pair of mold releasing resin films, and hot-pressing in a vacuum. The hologram recording medium 42 taking the form of a sheet is peeled off from the resin films, cut into chips of several mm square (for example, 8 mm square), and used. Preferably, the heating temperature is set to at least the glass transition point (Tg) of the recording material, and the press pressure is set to in the range of about 0.01 to 0.1 t/cm$^2$. For mold release mold releasing resin films, for example, polyethylene terephthalate (PET) films, having silicone resin coatings, can be used.

The reflection layer 44 is made by forming a thin film of a light reflective material, having a reflection factor of at least 70% for laser light used for recording and reproduction, on a substrate of a resin film or the like. As such a light reflective material, for example, metals, and semi-metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, and the like or stainless steel can be used. Among these materials, Au, Ag, or Al or their alloys are preferable, and Al (aluminum) is most preferable. The above-described light reflective materials may be used singly or may be used as combination of two or more.

The reflection layer 44 can be formed by, for example, vapour deposition, sputtering or ion plating of the above-described light reflective materials on a resin film or the like. From the viewpoint of prevention of bulkiness, it is desirable that the thickness of the reflection layer 44 is in the range of about 1 nm to 100 μm. In this range, the thinner, the more desirable. As such a reflection layer, "Ruppy (R)" produced by Cemedine Co., Ltd can be used. Incidentally, if the paper 36 itself has a high reflection factor, as in some coated papers, the reflection layer may also be omitted.

The protection film 46 is formed of a resin film that is transparent, to the laser light which is to be used for recording and reproduction, and that is flexible. Furthermore, the protection film 46 may include an adhesive layer having adhesiveness. On the adhesive layer, a hologram recording medium 42 taking the form of a sheet can be held. If the hologram recording medium can be attached to a base material sufficiently by press bonding, the adhesive layer is not required. If the recording medium is thick, or long term stability is desired, it is preferable to have an adhesive layer on the protection film.

From the viewpoint of prevention bulkiness, it is desirable that the thickness of the protection film 46 is in the range of about 1 μm to 200 μm. In this range, the thinner, the more desirable. From the viewpoint of efficiency of light utilization, the transmittance of the protection film 46, for the laser light used for recording and reproduction, is preferably at least 50%, and more preferably at least 80%. As such a protection film, "OPP tape (R)" produced by NittoDenko Corporation, or the like, can be used.

Figure 2C:
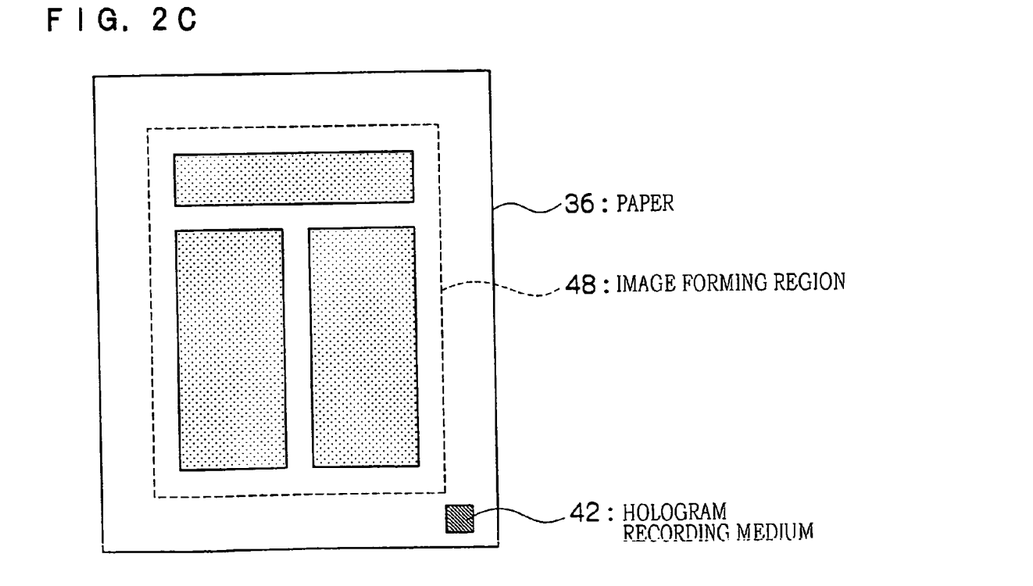

In the present embodiment, an example in which the hologram recording medium 42 is stuck on a face of the paper 36 having an image printed thereon (front face) will be described. However, the hologram recording medium 42 may be stuck on a face of the paper 36 having no image printed thereon (rear face). If the hologram recording medium 42 is stuck on the surface of the paper 36, it is desirable to avoid a region 48, having the image printed thereon, and stick the hologram recording medium 42 in a margin portion at the periphery of the region 48 as shown in FIG. 2C.

Various kinds of related information relating to the image can be recorded on the hologram recording medium 42. As such related information, there is: (a) information relating to the settings and history used from the printing of the image on the paper; (b) additional information, which is not indicated on the paper; (c) region data, representing the regions on the paper in which the image is displayed, and attribute data, representing attributes of images displayed in each region; (d) authentication data for restricting access to the related information; and (e) distribution restriction information, and the like, for restricting copying of the displayed image and distribution of the related information.

Figure 3A:
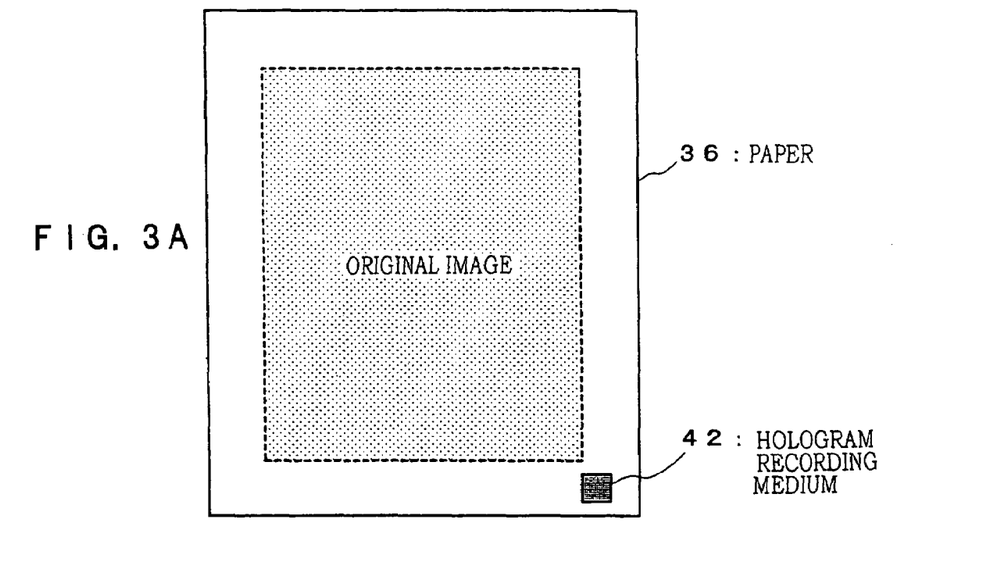
FIG. 3A is a diagram showing a layout of a page having an original image printed thereon in the present embodiment.
Figure 3B:
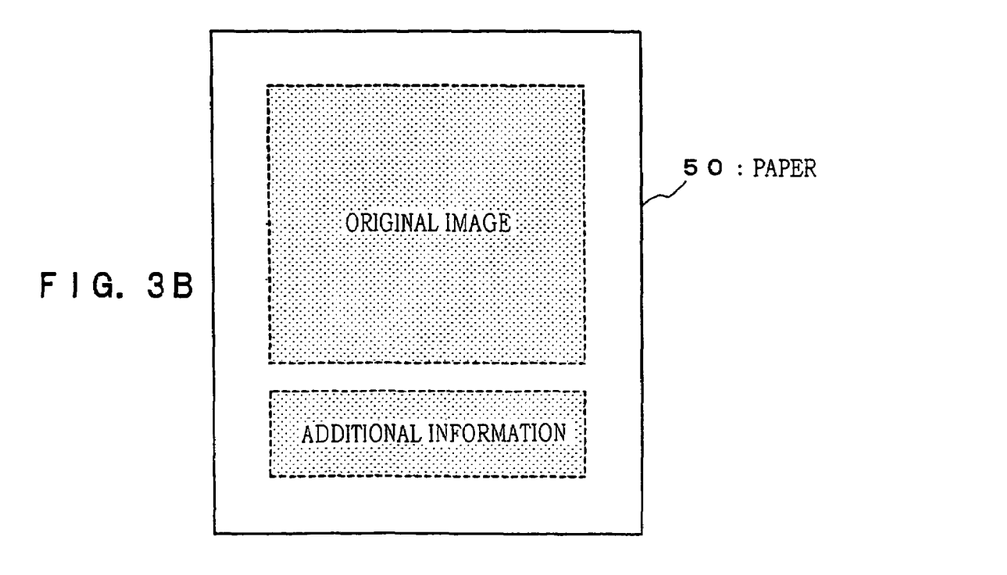
FIG. 3B is a diagram showing a layout of a new page where additional information which was recorded in the hologram recording medium attached to the page shown in FIG. 3A has been printed out, together with the original image.

For example, as shown in FIG. 3A, a hologram recording medium 42 is attached to paper 36 having an image original printed thereon, and the additional information of (b) is recorded in the medium 42. When printing an image on new paper by using the paper 36 as the original, it is possible to read out the additional information from the hologram recording medium 42, and print the image original read from the original and the additional information on the new paper 50 as shown in FIG. 3B.

Furthermore, by recording the authentication data of (d) as well as the reproduction restriction information of (e) on the hologram recording medium 42, reproduction of electronic information can be restricted accordingly. In this way an information transmission medium with high security can be provided. A high security system can be constructed by using such a medium.

To sum up, it is possible to record all data about a printed image on the hologram recording medium 42.

(Postprocessing Apparatus)

Figure 4:
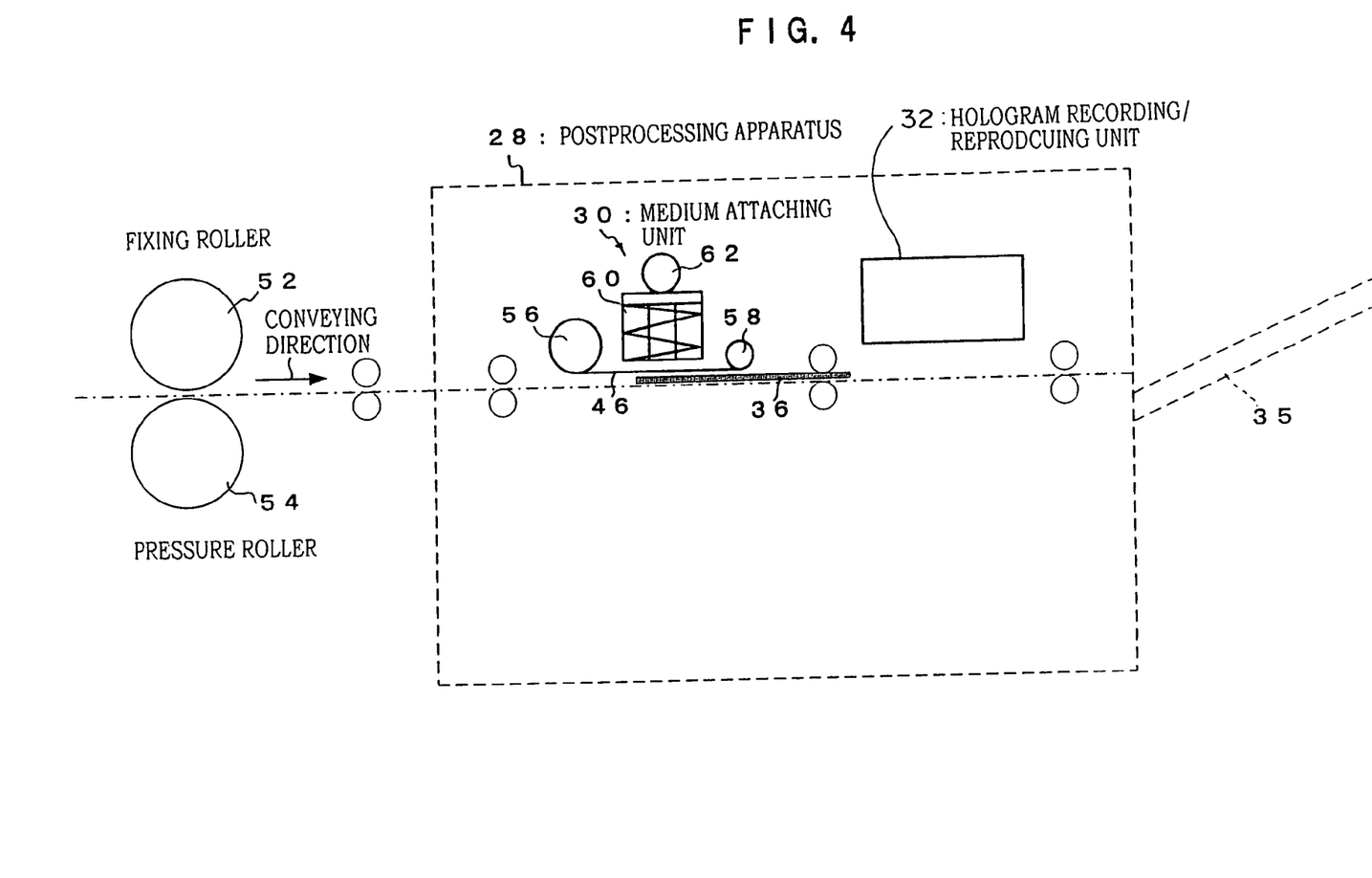
FIG. 4 is a schematic configuration diagram of a postprocessing apparatus of the present embodiment.

In the postprocessing apparatus 28, the above mentioned medium attaching unit 30 and the hologram recording/reproduction unit 32 are disposed, in the listed order from the upstream-side, along a conveying path of the paper 36, represented by an alternate long and short dash line, as shown in FIG. 4. The paper 36 is supplied from a fixing unit, including a fixing roller 52 and a pressure roller 54, in the printing apparatus 10 to the postprocessing apparatus 28. As a result, the paper 36 having a fixed electrophotographic image subjected to postprocessing.

—Medium Attaching Unit—

The medium attaching unit 30 includes: a tape-like protection film 46, a supply reel 56 for supplying the protection film 46; a take-up reel 58, for taking up the protection film 46; a punch 60, for stamping out the protection film 46 in a predetermined shape; and, a cam 62 for rotating an eccentric axis to make the punch 60 rise and fall.

The protection film 46 is retained wound around the supply reel 56 with its non-adhesive surface directed inward, and taken up around the take-up reel 58 by rotation of a motor (not shown).

Figure 5:
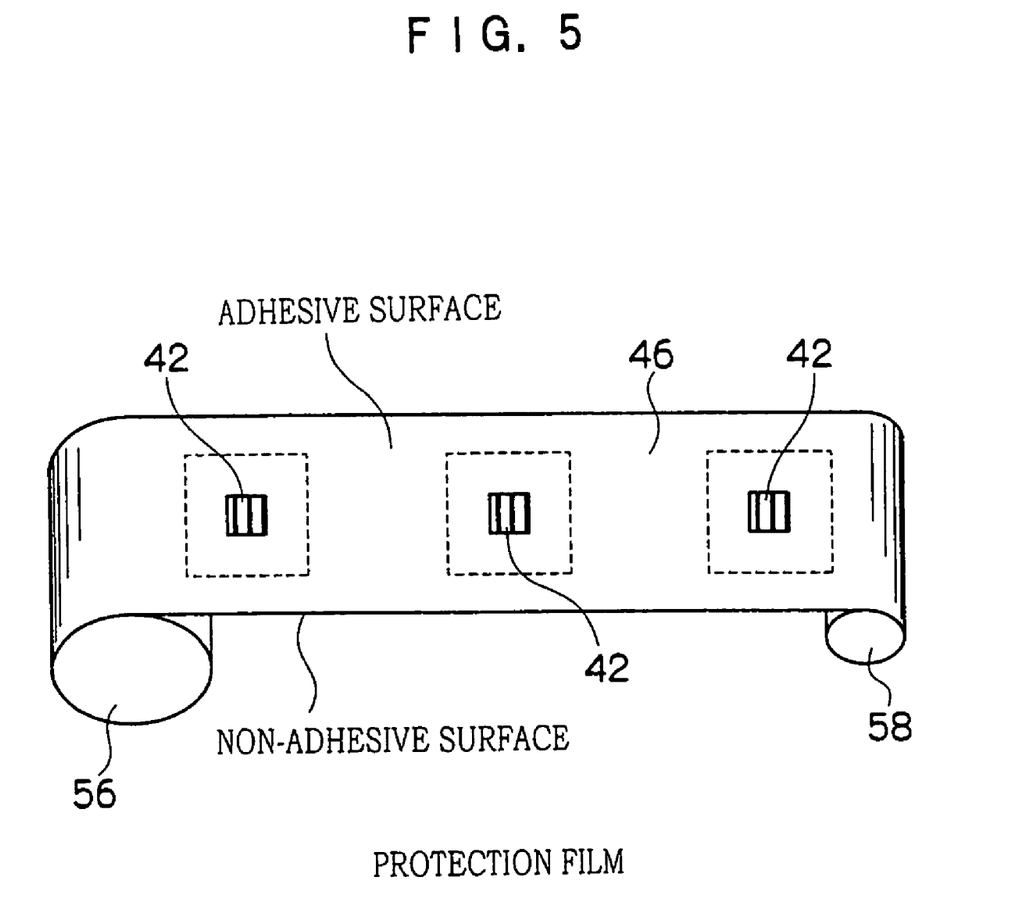
FIG. 5 is a perspective view showing a configuration of a protection film of the present embodiment.

As shown in FIG. 5, the hologram recording media 42 are held on one surface of the protection film 46 at predetermined intervals in the length direction of the protection film 46. The protection film 46 is stretched between the supply reel 56 and the take-up reel 58 that its surface having the hologram recording media 42 held thereon face to the paper 36 conveyed along the conveying path.

The punch 60 is disposed between the supply reel 56 and the take-up reel 58. At times of non-operation, when the attaching operation is not being conducted, the punch 60 is pushed in a direction opposite to the protection film 46 by a spring or the like. At times when the attaching operation is being carried out, the cam 62 is rotated to press the punch 60 towards the protection film 46. The protection film 46 is conveyed to a predetermined position, such that one of the retained hologram recording medium 42 is aligned with the punch 60, with the rear surface of the protection film 46 opposing the punch 60.

By pressing the protection film 46 from the opposite side of the surface having the hologram recording medium 42 held thereon, the punch 60 stamps out a portion of the protection film 46 holding the hologram recording medium 42, and attaches hologram recording medium 42 to the surface of the paper 36. Although not shown, the reflection layer 44 is placed on each one of the hologram recording media 42 held on the protection film 46, and attached to the surface of the paper 36 together with the hologram recording medium 42.

A motor (not shown) for rotating the take-up reel 58 and the cam 62 are controlled by the postprocessing control unit (not shown) via a driving unit (not shown).

—Hologram Recording/Reproduction Unit—

Figure 6:
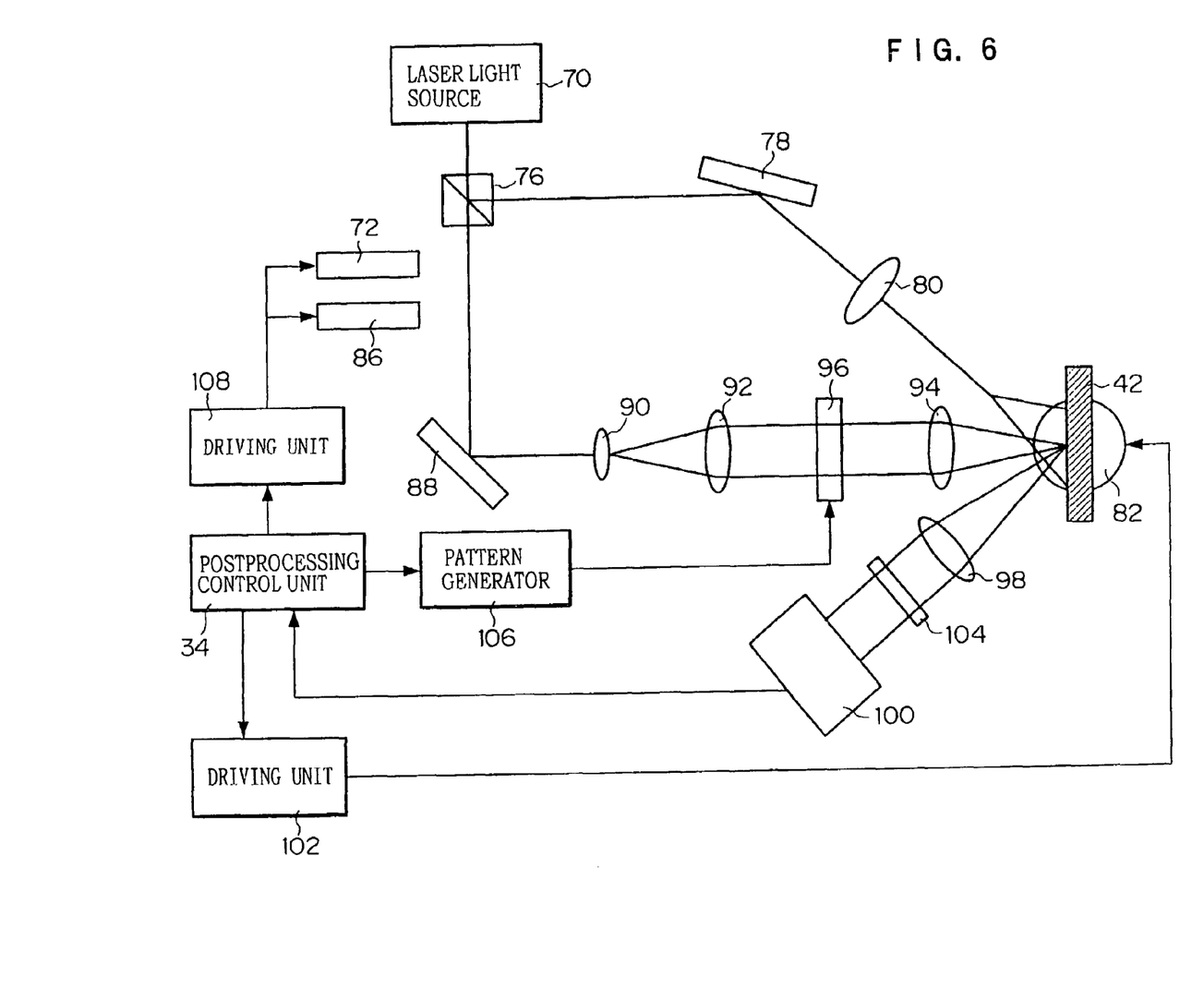
FIG. 6 is a schematic configuration diagram of a hologram recording/reproduction unit in the present embodiment.

A configuration of the hologram recording/reproduction unit 32 will now be described. In this unit, holograms including information corresponding to multiple of pages can be multiplex recorded.

As shown in FIG. 6, a laser light source 70 using, for example, Nd:YVO4 crystal is provided in the hologram recording/reproduction unit 32. Laser light oscillating having a wavelength of 532 nm, which is coherent light, is generated in the laser light source 70 and irradiated therefrom. On the irradiation side of the laser light source 70, a polarization beam splitter 76 is disposed, splitting the laser light into light for a reference beam and light for a signal beam by transmitting p-polarized light and reflecting s-polarized light.

On the light reflection side of the polarization beam splitter 76 are disposed in the following order: a reflection mirror 78, for reflecting the laser light for the reference beam and thereby changing the optical path to a direction toward the hologram recording medium; and an objective lens 80, for focusing the laser light for the reference beam and generating the reference beam formed of a spherical reference wave.

The objective lens 80 irradiates s-polarized light, which is a spherical reference wave, to the hologram recording medium 42 as the reference beam. On the laser light focusing side of the object lens 80 is provided an x-y stage 82. This stage includes a stepping motor for moving the hologram recording medium 42, formed as a sheet, in the x-y direction.

On the light transmission side of the polarization beam splitter 76 are provided: a shutter 72 for blocking p-polarized light, transmitted by the polarization beam splitter 76; and an optical rotator 86 for rotating the plane of polarization by 90 degrees. These are disposed so that each is capable of being inserted into or removed from the optical path independently. On the light transmission side of the optical rotator 86 is provided, disposed in the following order: a reflection mirror 88, for reflecting the laser light for the signal beam with a reflection angle of 45 degrees, and thereby changing the optical path to a direction toward the hologram recording medium; and, a lens system, including lenses 90, 92 and 94.

A transmissive spatial light modulator device 96, formed from a liquid crystal display element or the like, is disposed between the lens 92 and the lens 94 to modulate laser light of the signal beam, according to a supplied recording signal for each page, and to generate the signal beam for recording the hologram of each page.

The lenses 90 and 92 collimate laser light to a beam having a large diameter and irradiate the resultant laser light to the spatial light modulator 96. The lens 94 focuses the p-polarized light modulated and transmitted by the spatial light modulator 96, onto the hologram recording medium 42 as the signal beam. At this time, focusing is conducted so as to make the focused spot of the signal beam smaller than the focused spot of the reference beam, and the signal beam and the reference beam are simultaneously irradiated to the hologram recording medium 42.

Since the p-polarized light is used as the signal beam and the s-polarized light is used as the reference beam, the polarization direction of the signal beam is perpendicular to the polarization direction of the reference beam when recording the hologram of each page. It is also possible to use the s-polarized light as the signal beam and the p-polarized light as the reference beam. A signal beam and a reference beam that are parallel in the plane of polarization may also be used. Circularly polarized light, rotating in different directions, may also be used as the signal beam and the reference beam.

On the reproduced light reflection side of the hologram recording medium 42 are disposed: a lens 98; an analyzer 104, for selectively and transmitting light of predetermined polarization directions from the reproduced light (for example, a 0° polarization component, a 45° polarization component, or a 90° polarization component); and, a detector 100, including an image pickup element, such as a CCD or the like to convert received reproduced light to an electric signal and output the electric signal are disposed. The detector 100 is connected to the postprocessing control unit 34.

The postprocessing control unit 34 is connected to the spatial light modulator 96 via a pattern generator 106. The pattern generator 106 generates a pattern according to a recording signal supplied from the postprocessing control unit 34 with predetermined timing. Furthermore, a driving unit 108 is connected to the postprocessing control unit 34 to drive the shutter 72 and the optical rotator 86 so as to insert them independently into the optical path, and drive the shutter 72 or the optical rotator 86 so as to remove them independently from the optical path. A driving unit 102, for driving the x-y stage 82, is connected to the postprocessing control unit 34.

Recording and reproduction operations in the hologram recording/reproduction unit 32 will now be described.

In the case of the hologram recording process, information to be recorded is previously input to the postprocessing control unit 34, and a recording signal is generated beforehand. The driving unit 108 is driven to remove the shutter 72 and the optical rotator 86 from the optical path so that the laser light can pass. Next, laser light is irradiated. While moving the hologram recording medium 42 in the x-y direction, and a recording signal of each page is supplied to the spatial light modulator 96 with predetermined timing, so as to record pages of the hologram at intervals of unit shift δ from the start position of the recording. Shift multiplex recording process of the hologram onto the hologram recording media 42 is thus executed.

Figure 7A:
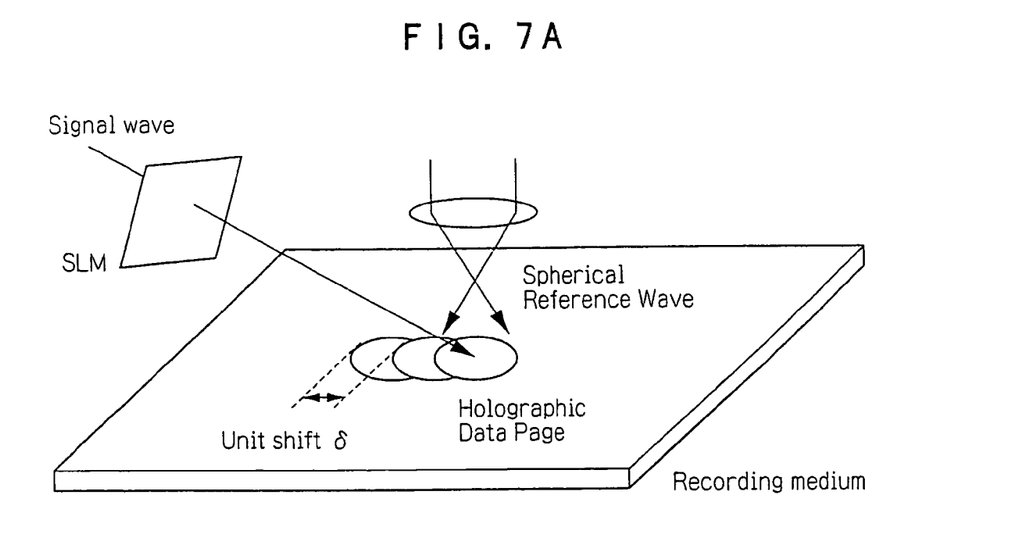
FIG. 7A is a diagram showing a concept of shift multiplex recording of a hologram.
Figure 7B:
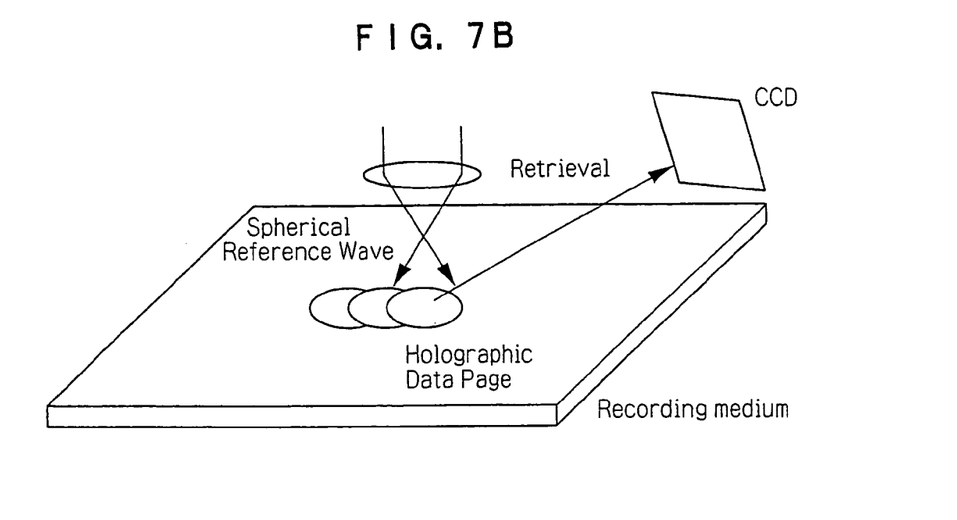
FIG. 7B is a diagram showing that the multiplex recorded hologram can be reproduced.

In the present embodiment, shift multiplex recording is conducted by using a spherical wave as the reference beam and moving (shifting) the sheet-like hologram recording media 42 in the x-y direction. In this shift multiplex recording method, it is possible to record holograms which correspond to several pages, one over the other in the same region of the hologram, by shifting the media. If the wavelength of laser light, the film thickness of the recording media, and the numerical aperture of the objective lens are suitably set, it is possible to multiplex record holograms which correspond to several pages, in approximately the same region of the medium, simply by moving the hologram recording medium 42 so as to shift the recording position by several tens of μm as shown in FIGS. 7A and 7B. As a result, holograms of the pages can be reproduced without crosstalk. This uses the fact that the reference beam is a spherical wave, and consequently a shift (a movement of several tens of μm) of the hologram recording medium is equivalent to a change of the angle of the reference beam.

A distance which determines the unit shift δ of the hologram recording medium 42 in the shift multiplex recording using a spherical reference wave, i.e., a distance δ spherical at which mutual holograms can be separated independently is given by the following equation (1).

$$\delta_{spherical} = \delta_{Bragg} + \delta_{NA} \approx \frac{\lambda z_0}{L\tan\theta_S} + \frac{\lambda}{2(NA)} \quad (1)$$

Here, λ is a wavelength of laser light, $z_0$ is a distance between the objective lens which generates a spherical reference wave and the hologram recording medium, L is a thickness of the hologram recording medium, NA is the numerical aperture of the objective lens, and $\theta_S$ is the angle between the signal beam and the reference beam. As appreciated from the equation (1), the unit shift δ, determined according to the distance at which mutual holograms can be separated independently, becomes smaller as the thickness L of the hologram recording medium increases. Therefore, the level of multiplexing can be increased and the storage capacity can be increased.

On the other hand, in the case of the hologram reproduction process, the shutter 72 is inserted into the optical path. As a result, laser light transmitted by the polarization beam splitter 76 is blocked by the shutter 72, and consequently only the reference beam is irradiated to the hologram recording medium 42, having the hologram recorded thereon. Reproducing light diffracted by the hologram recording medium 42 is transmitted by the lens 98. Only reproducting light having predetermined polarized light components is selected and transmitted by the analyzer 104. The reproducing light received by the detector 100 is converted to an electric signal by the detector 100, and input to the postprocessing control unit 34. Data thus read out is displayed on a display unit (not shown) directly or indirectly connected to the postprocessing control unit 34.

An example in which shift multiplex recording is conducted by moving the hologram recording medium 42 has been described. Instead of moving the hologram recording medium 42, the hologram recording medium 42 may also be scanned with the signal beam and/or the reference beam.

An example in which the hologram recording/reproduction unit 32 is provided has been described. In cases where the hologram reproducting function is not necessary, the configuration of the reproduction unit can be omitted.

(Postprocessing Operation)

Next, a case where an image is formed and printed on paper by the above described image forming apparatus, and how during postprocessing the processes of attaching the hologram recording medium to the paper, and recording related information on the hologram recording medium are executed will be described.

Figure 8:
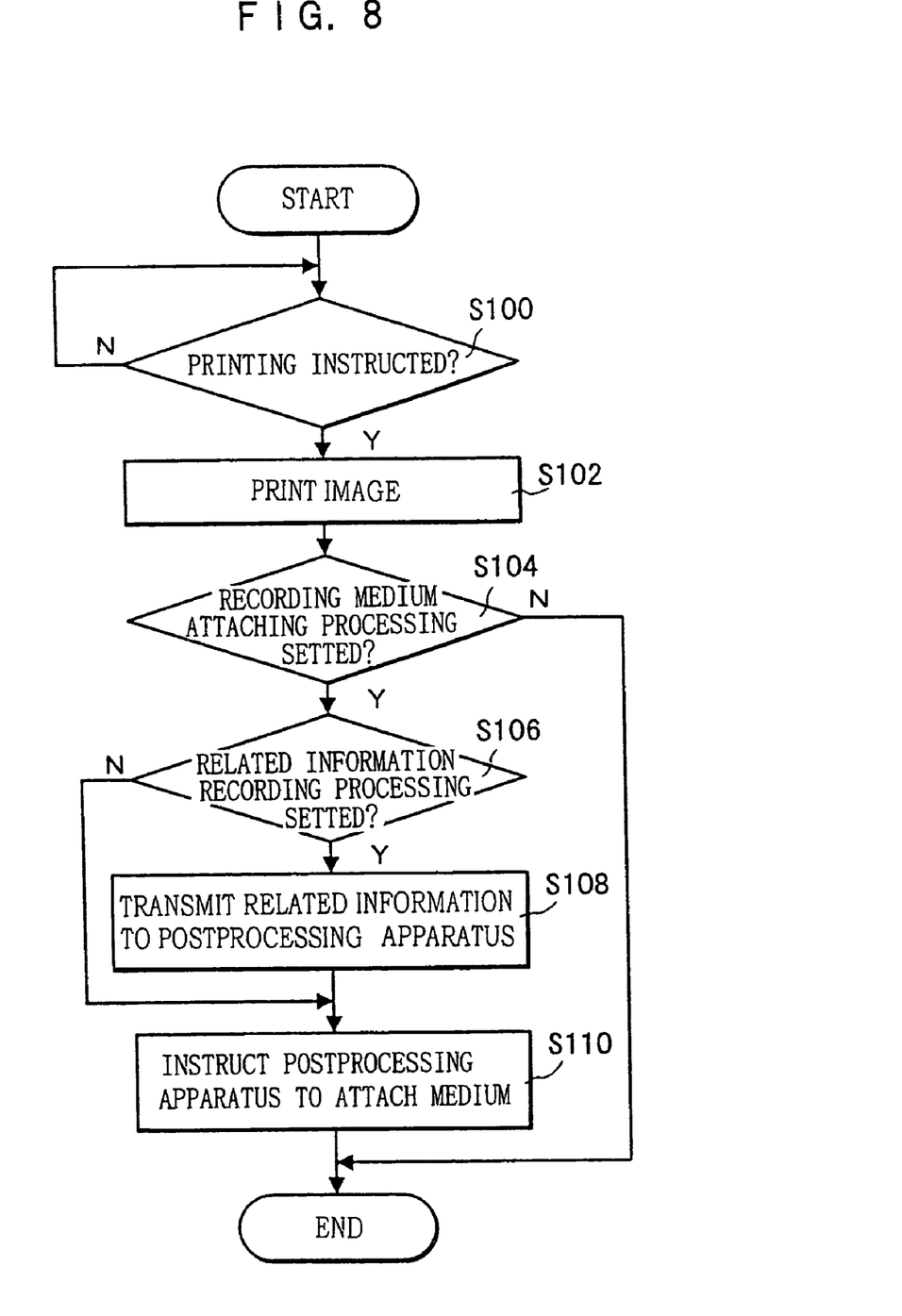
FIG. 8 is a flow chart showing a control routine of an apparatus control unit of the present embodiment.

FIG. 8 is a flow chart showing a control routine in the apparatus control unit 26.

In step 100(S100), whether a printing instruction has been input via the UI unit 14, shown in FIG. 1, is determined. As already described, besides setting the number of output sheets and the number of output copies, and so on, the user also sets the postprocessing and instructs the start of printing by operating the operation panel 40 in the UI unit 14.

If it is determined that the start of the printing operation has been instructed, then in step 102(S102), the automatic document feeding apparatus 12, the image reading unit 16, the image storage unit 18 and the image forming unit 20 is controlled to print an image on the paper. In other words, the automatic document feeding apparatus 12 is driven to convey the original to the image reading unit 16, and the image reading unit 16 is driven to read an image of the conveyed original. Image data thus read is subjected to image processing and stored temporarily in the image storage unit 18. Next, the image data stored in the image storage unit 18 is read out, and the image forming unit 20 is driven, printing an image on the paper 36 on the basis of the image data read out.

Subsequently, in step 104(S104), whether the process of attaching the hologram recording medium has been set for postprocessing is determined. If the medium attaching process has been set, then it is determined at step 106(S106) whether the process of recording related information on the hologram recording medium has been set is determined. If the medium attaching process has not been set, then it is not necessary to execute postprocessing, and consequently the routine is finished.

Figure 9A:
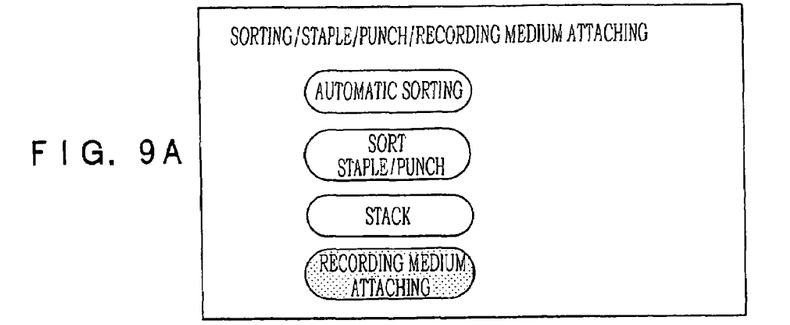
FIG. 9A, FIG. 9B, FIG. 9C, and FIG. 9D are diagrams showing views displayed on an operation panel of the present embodiment.
Figure 9B:
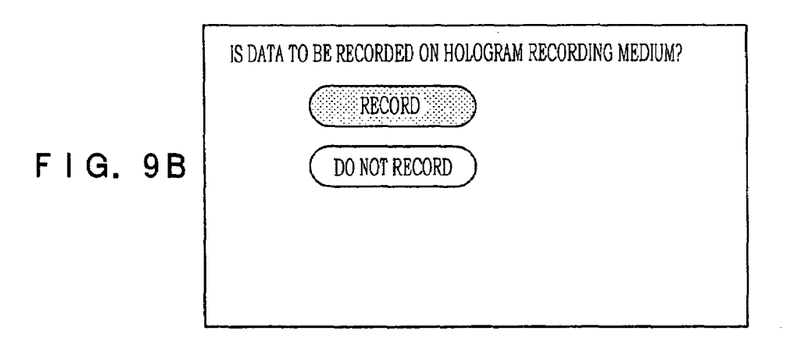
Figure 9C:
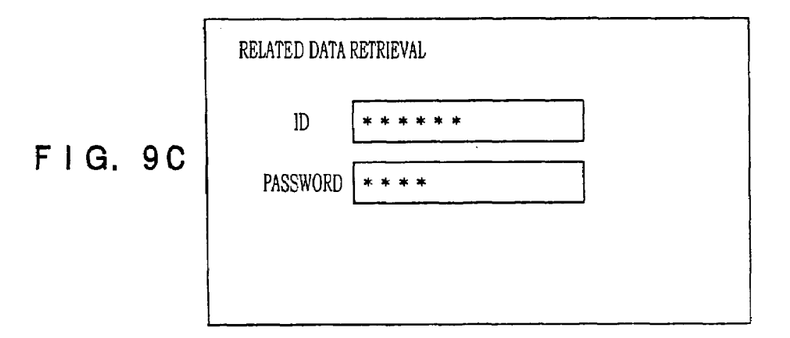

For example, a postprocessing setting screen view is displayed on the operation panel 40 as shown in FIG. 9A. In this setting screen view, the process of attaching the hologram recording medium (recording medium attaching) can be selected. If the user selects the "recording medium attaching" by operating the operation panel 40, then a selection screen view for selecting whether to record related information on the hologram recording medium or not is displayed as shown in FIG. 9B. If "Record" is selected, then a retrieval screen view for retrieving related information received by the data receiving unit 24 is displayed as shown in FIG. 9C. By inputting a document ID and a password in this retrieval screen view, the user can retrieve related information previously transmitted.

Figure 9D:
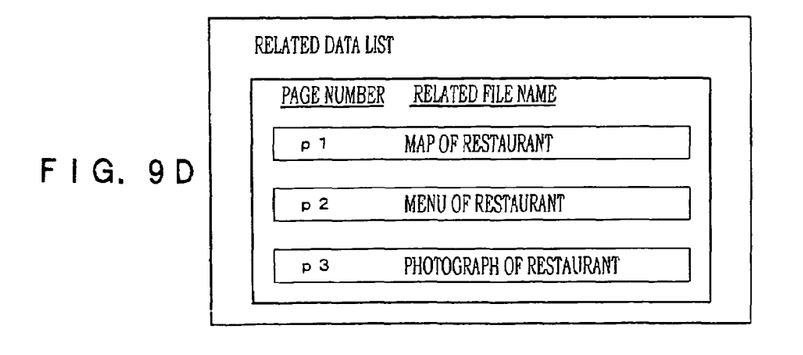

Retrieved related information is displayed for each page of a printing job being output, as shown in FIG. 9D. For example, in this case, a restaurant guide article is to be printed over three pages. Electronic information "map of restaurant" is added to a first page as related information recorded in a hologram recording medium attached to the paper. Electronic information "menu of restaurant" is added to a second page as related information recorded in a hologram recording medium attached to the paper. Electronic information "photograph of restaurant" is added to a third page as related information recorded in a hologram recording medium attached to the paper.

Related information received by the data receiving unit 24 is temporarily stored in a storage unit (not shown). Therefore, if the related information recording processing is selected in the step 106, the related information stored in a storage unit (not shown) is read out and transmitted to the postprocessing control unit 34 for controlling the postprocessing apparatus 28 in step 108(S108). In step 110(S110), the postprocessing control unit 34 is ordered to execute the hologram recording medium attaching process, and the routine is finished.

On the other hand, if the related information recording processing is not selected in the step 106, then in the step 110 the postprocessing control unit 34 is ordered to execute the hologram recording medium attaching process, and the routine is finished.

Figure 10:
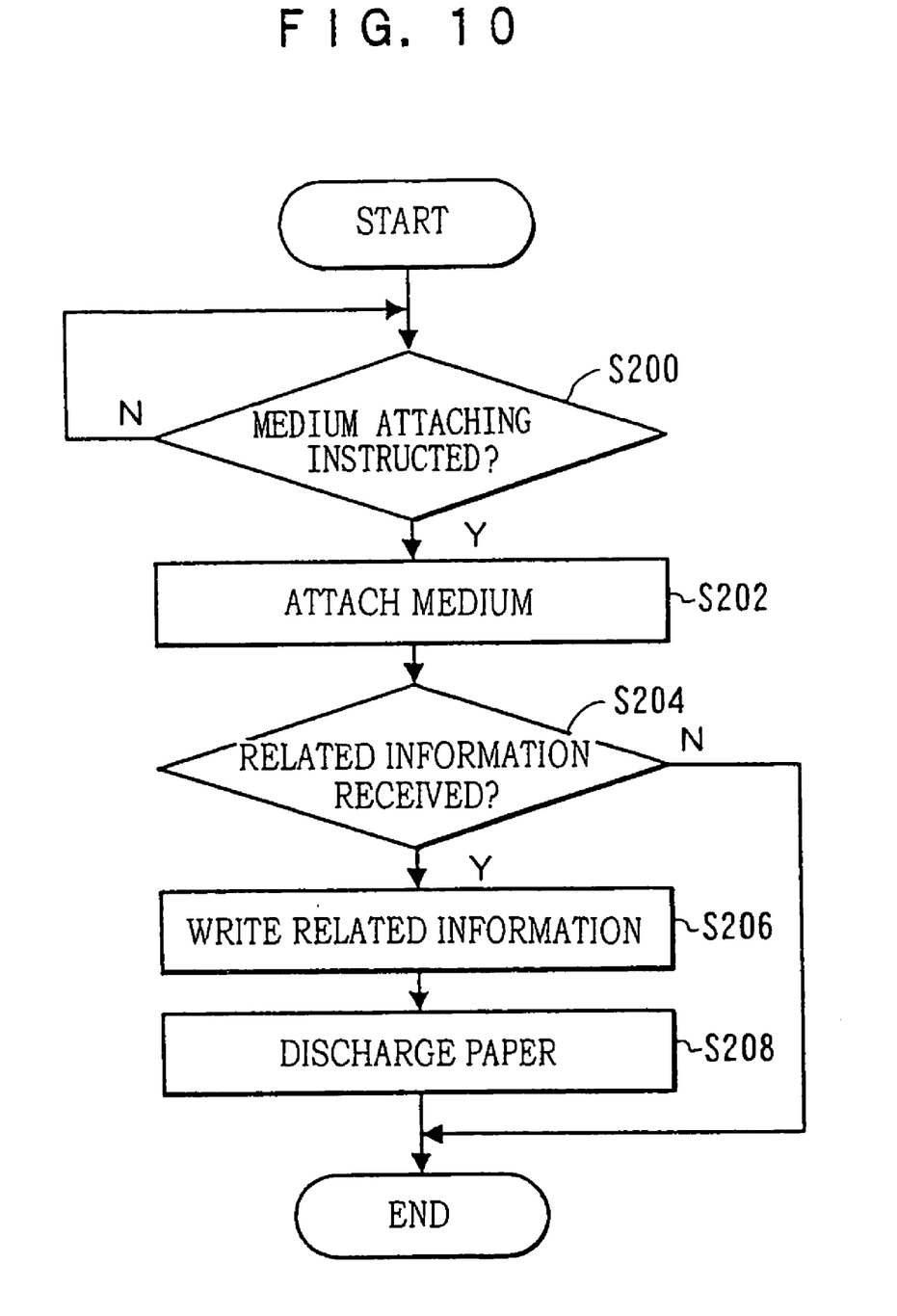
FIG. 10 is a flow chart showing a control routine of a postprocessing control unit of the present embodiment.

FIG. 10 is a flow chart showing a control routine of the postprocessing control unit 34.

If the apparatus control unit 26 in the printing apparatus 10 instructs the postprocessing control unit 34 to execute postprocessing, then the process shifts to the routine shown in FIG. 10. In step 200(S200), whether execution of the hologram recording medium attaching processing is ordered or not is determined. If it is determined that medium attachment has been ordered, then in step 202(S202) the medium attaching unit 30 is driven to attach the hologram recording medium 42 onto the paper having an image printed thereon. A hologram recording medium 42 is attached to each sheet of paper.

Next, in step 204(S204) whether related information has been received is determined. If related information is determined to has been received, then in step 206(S206) the hologram recording/reproduction unit 32 is driven to record corresponding related information on each of the hologram recording media 42 respectively attached to sheets of paper. In step 208(S208), sheets of paper are discharged onto a receiving tray 35 in the postprocessing apparatus 28.

On the other hand, if it is determined that the related information has not been received, then the process for related information recording is not executed, and in the step 208(S208) paper is discharged to the receiving tray 35 in the postprocessing apparatus 28, and the routine is finished. In other words, in this case, only the hologram recording medium attaching processing is executed, and nothing is recorded on any of the hologram recording media 42 attached to each of the pages.

As heretofore described, in the present embodiment, it becomes possible to write electronic information, related to a printed image, directly on a hologram recording medium, by sticking the hologram recording medium (electronic medium) to the paper (paper medium) having an image printed thereon. For example, since it is also possible to record different electronic information on each page. The present embodiment is also suitable for on-demand printing which provides a necessary number of copies when needed.

Furthermore, the hologram recording medium has far greater storage capacity than a two-dimensional code or semiconductor chip. Therefore, it is possible to provide a novel information media in which on electronic medium capable of transmitting a large amount of electronic information and paper medium are integrated into one body. Especially, by executing volume multiplex recording of holograms as shown in the present embodiment, recording with an even larger capacity becomes possible.

Since the electronic media and the paper media are integrated into one body, it is not necessary to provide a server or the like for storing and managing the electronic information. A large-scale system is not required, and the cost will be reduced.

In the above-described embodiment, an example in which related information is recorded on a hologram recording medium attached to paper has been described. However, it is also possible to previously record the related information on a hologram recording medium beforehand, and then attach the hologram recording medium having the related information recorded thereon.

In the above-described embodiment, an example in which paper is used as an image forming member has been described. As the image forming member, however, metal (such as aluminum) and the like, plastics, or ceramics (such as alumina) and the like and other materials can be used besides paper. Although the shape of the image forming member is not especially restricted, it is preferable that the image forming member takes the shape of a film. For example, a resin film for OHP use can be used as the image forming member. Typically, a light transmitting resin film is used for OHP. As the light transmitting resin film, a polyester film, and in particular biaxial stretched polyethylene terephthalate film is frequently used. Incidentally, if the image forming member is transparent, recording and reproduction can be conducted by using the hologram recording medium as a transmitting medium.

In the above-described embodiment, an example in which postprocessing (hologram recording medium attaching process and related information recording process) is executed on paper immediately after an image has been formed, in the postprocessing apparatus mounted on the image forming apparatus has been described. However, it is also possible to separate the postprocessing apparatus from the image forming apparatus and execute only postprocessing on paper having an image formed thereon. Furthermore, it is also possible to execute the hologram recording medium attaching processing and the related information recording processing before the fixing process in the electrophotography.

What is claimed is:

1. A postprocessing apparatus that conducts postprocessing on an image forming member, comprising:
   a receiving unit that receives an image forming member having an image formed thereon; and
   an attaching unit that attaches a hologram recording medium to the image forming member, the hologram recording medium having related information that comprises digital data related to the image formed on the image forming member,
   wherein the related information comprises at least one type of information selected from the following information groups,
   (a) information concerning settings used and history from the forming of the image on the image forming member;
   (b) additional information that is not displayed on the image forming member;
   (c) region data representing regions of the image forming member in which the image is displayed, and attribute data representing attributes of images displayed in each region;
   (d) authentication data for restricting access to the related information;
   (e) distribution restriction information for restricting copying of the displayed image and distribution of related information, and
   (f) at least a part of image information being formed on the image forming member.

2. A postprocessing apparatus according to claim 1, wherein the attaching unit attaches the hologram recording medium after the image is fixed on the image forming member.

3. A postprocessing apparatus according to claim 1, further comprising an instruction unit that instructs attachment of the hologram recording medium.

4. A postprocessing apparatus according to claim 1, wherein associated with the hologram recording medium is a protection member, and the attaching unit attaches the hologram recording medium with the protection member to the image forming member so that the protection member is on the outside of the hologram recording medium.

5. A postprocessing apparatus according to claim 1, further comprising:

a control unit that receives the related information related to the image formed on the image forming member, wherein the attaching unit attaches the hologram recording medium having the received related information to the image forming member.

6. A postprocessing apparatus according to claim 1, wherein the related information comprises information concerning settings used and history from the forming of the image on the image forming member.

7. A postprocessing apparatus according to claim 1, wherein the related information comprises additional information that is not displayed on the image forming member.

8. A postprocessing apparatus according to claim 1, wherein the related information comprises region data representing regions of the image forming member in which the image is displayed, and attribute data representing attributes of images displayed in each region.

9. A postprocessing apparatus according to claim 1, wherein the related information comprises authentication data for restricting access to the related information.

10. A postprocessing apparatus according to claim 1, wherein the related information comprises distribution restriction information for restricting copying of the displayed image and distribution of related information.

11. A postprocessing apparatus according to claim 1, wherein the related information comprises at least a part of image information being formed on the image forming member.

12. A postprocessing apparatus that conducts postprocessing on an image forming member, the postprocessing apparatus comprising:

a receiving unit that receives an image forming member having an image formed thereon; and a control unit that receives related information that comprises digital data related to the image formed on the image forming member;

a recording unit that writes the received related information onto a hologram recording medium attached to the image forming member, wherein the related information comprises at least one type of information selected from the following information groups, (a) information concerning settings used and history from forming of the image on the image forming member;

(b) additional information that is not displayed on the image forming member;

(c) region data representing regions of the image forming member in which the image is displayed, and attribute data representing attributes of images displayed in each region;

(d) authentication data for restricting access to the related information;

(e) distribution restriction information for restricting copying of the displayed image and distribution of the related information, and (f) at least a part of image information being formed on the image forming member.

13. A postprocessing apparatus according to claim 12, wherein when related information is input from outside the postprocessing apparatus, the recording unit writes the related information onto the hologram recording medium.

14. A postprocessing method for conducting postprocessing on an image forming member having an image formed thereon, the postprocessing method comprising:

an attaching process for attaching a hologram recording medium in which a hologram can be written, to the image forming member;

a receiving process for receiving related information that comprises digital data related to the image formed on the image forming member; and a recording process for writing related information that comprises digital data related to an image formed on the image forming member, onto the hologram recording medium, wherein the related information comprises at least one type of information selected from the following information groups, (a) information concerning settings used and history from the forming of the image on the image forming member;

(b) additional information that is not displayed on the image forming member;

(c) region data representing regions of the image forming member in which the image is displayed, and attribute data representing attributes of images displayed in each region;

(d) authentication data for restricting access to the related information;

(e) distribution restriction information for restricting copying of the displayed image and distribution of the related information, and (f) at least a part of image information being formed on the image forming member.

15. A postprocessing method according to claim 14, wherein the attaching process attaches the hologram recording medium to the image forming member after the image is fixed on the image forming member.

16. A postprocessing method according to claim 14, wherein attachment of the hologram recording medium is instructed.

17. A postprocessing method according to claim 14, wherein the related information is related information input manually.

18. A postprocessing method according to claim 14, wherein associated with the hologram recording medium is a protection member, and the attaching process attaches the hologram recording medium with the protection member to the image forming member so that the protection member is outside of the hologram recording medium.

* * * * *